(12) United States Patent
Brost

(10) Patent No.: US 7,055,584 B2
(45) Date of Patent: Jun. 6, 2006

(54) HEAT EXCHANGER WITH VALVE

(75) Inventor: Viktor Brost, Aichtal (DE)

(73) Assignee: Modine Manufacturing Company, Racine, WI (US)

( * ) Notice: Subject to any disclaimer, the term of this patent is extended or adjusted under 35 U.S.C. 154(b) by 7 days.

(21) Appl. No.: 10/847,080

(22) Filed: May 17, 2004

(65) Prior Publication Data

US 2004/0256086 A1 Dec. 23, 2004

(30) Foreign Application Priority Data

Jun. 18, 2003 (DE) .............................. 103 27 481

(51) Int. Cl.
*F28D 1/02* (2006.01)
*F28F 3/00* (2006.01)
(52) U.S. Cl. ...................... 165/153; 165/174
(58) Field of Classification Search ........ 165/152–153, 165/170, 174–176, 71, 98, 99
See application file for complete search history.

(56) References Cited

U.S. PATENT DOCUMENTS

| | | | | |
|---|---|---|---|---|
| 1,378,103 A | * | 5/1921 | Gal ............................ 165/153 |
| 1,657,359 A | * | 1/1928 | Hendrix ...................... 165/153 |
| 1,833,166 A | * | 11/1931 | Lucke ......................... 165/81 |
| 3,265,126 A | * | 8/1966 | Donaldson ................... 165/140 |
| 4,139,054 A | * | 2/1979 | Anderson ..................... 165/76 |
| 4,319,630 A | * | 3/1982 | Hronek et al. ................ 165/70 |
| 4,370,868 A | * | 2/1983 | Kim et al. .................... 62/504 |

FOREIGN PATENT DOCUMENTS

| | | |
|---|---|---|
| DE | 19962863 | 6/2001 |
| DE | 10142539 | 3/2003 |
| DE | 10142411 | 4/2003 |
| DE | 10144293 | 4/2003 |
| DE | 10229083 | 1/2004 |
| EP | 0916837 | 10/1998 |
| EP | 0992756 | 9/1999 |
| EP | 1376043 | 4/2003 |

* cited by examiner

*Primary Examiner*—Tho Duong
(74) *Attorney, Agent, or Firm*—Wood, Phillips, Katz, Clark & Mortimer

(57) ABSTRACT

A housingless plate heat exchanger including a plate stack defining fluid passages, at least one collecting tank with a peripheral edge enclosing one end of the plate stack, and a valve receivable in the collecting tank through an assembly opening of the soldered collecting tank and plate stack. The collecting tank and plate stack are soldered together and have a fluid opening. A method of manufacturing the heat exchanger includes the steps of assembling plates of the plate heat exchanger in a plate stack, placing a collecting tank on one end of the plate stack, soldering the plate stack and collecting tank together, and after the soldering step mounting a valve in the collecting tank.

5 Claims, 2 Drawing Sheets

HEAT EXCHANGER WITH VALVE

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward heat exchangers, and particularly toward housingless heat exchangers having a valve therein.

BACKGROUND OF THE INVENTION AND TECHNICAL PROBLEMS POSED BY THE PRIOR ART

Housingless plate heat exchangers are known in the art having plates secured in a plate stack with a collecting tank or header on one or more ends. In some heat exchangers of this type, a valve is used to allow regulation of the fluid flow(e.g., an exhaust stream) through the collecting tank. Unfortunately, heretofore manufacturing costs for heat exchangers have been relatively high, especially because of the not insignificant assembly costs for the valve.

This is the case with, as an example, the exhaust heat exchanger known from DE 101 42 539 A1 (which, however, is not a housingless plate heat exchanger). De 101 42 539 A1 teaches manufacturing the exhaust heat exchanger by welding connections, which is fairly costly. Welding methods also appear to be the preferred connection technique in the exhaust heat exchanger taught in DE 199 62 863 A1 (also not a housingless plate heat exchanger). In EP 916 837 A2, a valve is screwed onto the end of the heat exchanger in a housing, which will also cause significant manufacturing costs. The exhaust line is detachably fastened to the housing.

Valve components that are guided with their stem through two openings of a jacket tube, through which an exhaust stream can be guided, which is controllable by means of a flap fastened to the stem, are known from German applications DE 101 42 411 A1 and DE 101 44 293 A1. However, such arrangements also appear to cause enormous manufacturing expense, since numerous assembly operations must be conducted to manufacture the entire heat exchanger.

The present invention is directed toward overcoming one or more of the problems set forth above.

SUMMARY OF THE INVENTION

The invention concerns a housingless plate heat exchanger with at least one collecting tank and with inlet or outlet openings for fluid, which encloses one end of the plate stack with the peripheral wall edge of its wall, so that the plate heat exchanger can be manufactured with its at least one collecting tank in one process step, for example in a soldering operation. The invention also concerns a manufacturing method for such a plate heat exchanger, and an advantageously mounted valve for controlling flow in the heat exchanger.

According to one aspect of the present invention, a housingless plate heat exchanger is provided, including a plate stack defining fluid passages, at least one collecting tank with a peripheral edge enclosing one end of the plate stack, and a valve receivable in the collecting tank through an assembly opening of the soldered collecting tank and plate stack. The collecting tank and plate stack are soldered together and have a fluid opening.

In one form of this aspect of the present invention, the valve has a flap inside the collecting tank and a stem extending outside the collecting tank. In a further form, a bearing bushing is in the at least one assembly opening supporting the valve stem.

In another form of this aspect of the present invention, a second assembly opening is provided in the one collecting tank. In a further form, the first and second assembly openings are in opposite walls of the one collecting tank.

In still another form of this aspect of the present invention, cover plates are on the plate stack, protrusions are on the cover plates, and a valve retaining device is secured to the protrusions.

In another aspect of the present invention, a method of manufacturing a housingless plate heat exchanger is provided, including the steps of assembling plates of the plate heat exchanger in a plate stack, placing a collecting tank on one end of the plate stack, soldering the plate stack and collecting tank together, and after the soldering step mounting a valve in the collecting tank.

In one form of this aspect of the present invention, the valve is inserted through an assembly opening in the collecting tank to mount the valve in the collecting tank. In a further form, the assembly opening is formed in the collecting tank prior to the placing step.

In another form of this aspect of the present invention, the collecting tank includes a fluid opening, the opening being at least one of a heat exchanger inlet and outlet, and the valve is inserted through the opening during the mounting step.

In still another form of this aspect of the present invention, the valve includes a flap inside the collecting tank and a stem extending outside the collecting tank after the mounting step, and the flap and the stem are assembled together prior to the mounting step.

DETAILED DESCRIPTION OF THE INVENTION

Figure 1:
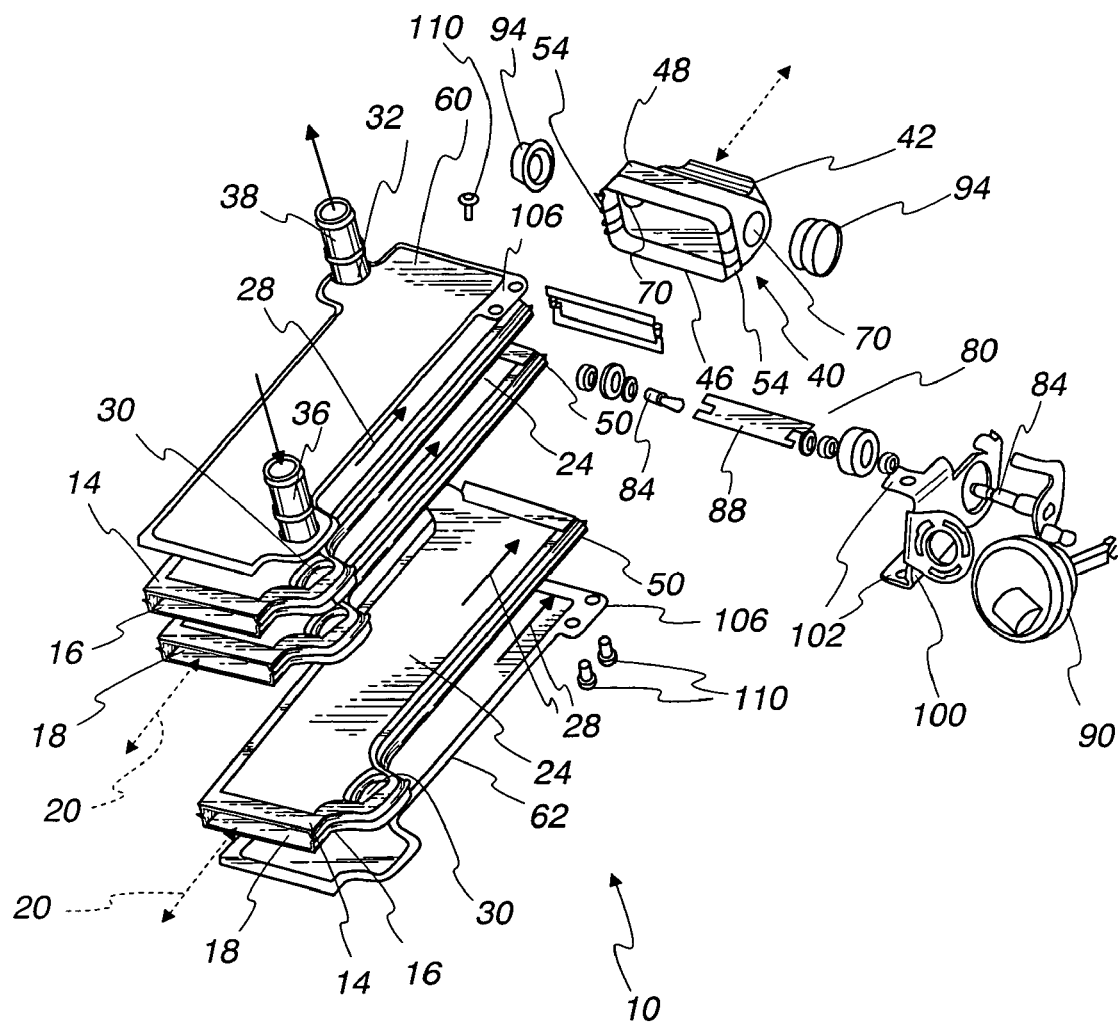
FIG. 1 is an exploded view of a plate heat exchanger.
Figure 2:
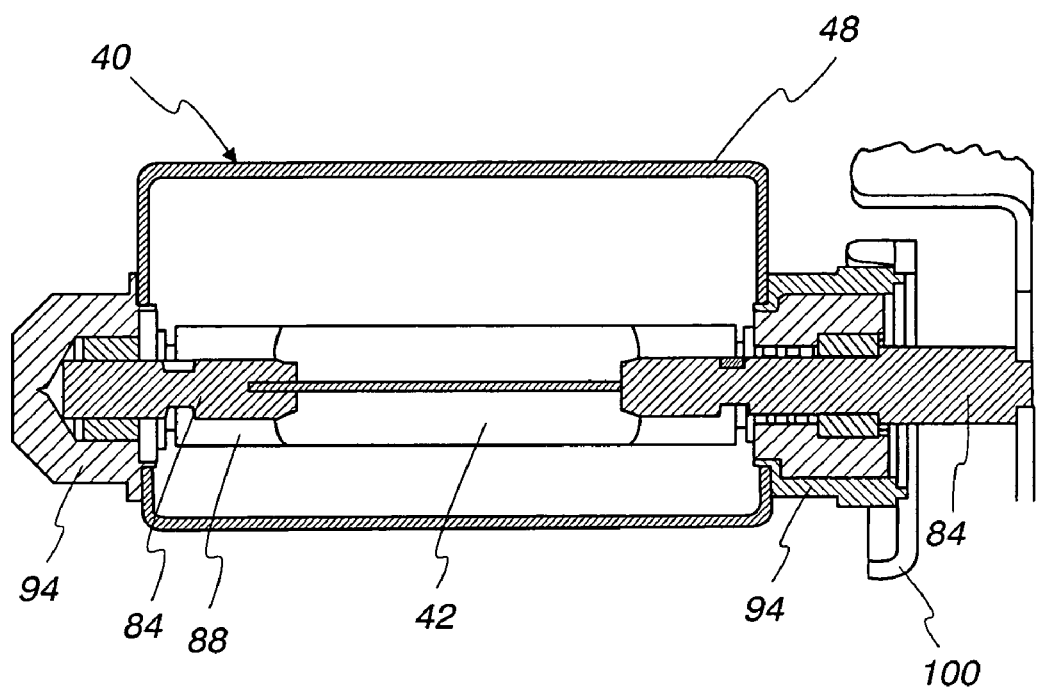
FIG. 2 is section through the collecting tank of the plate heat exchanger.
Figure 3:
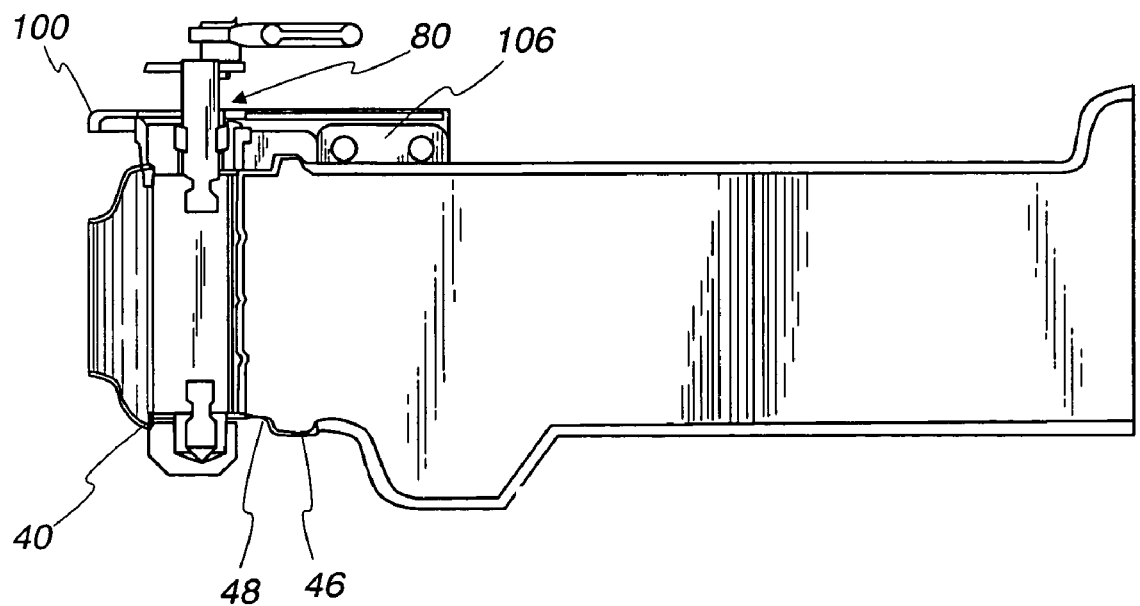
FIG. 3 is a top view of the plate heat exchanger.

A housingless heat exchanger 10 in accordance with the present invention is shown in exploded view in FIG. 1. In the practical example described herein, the heat exchanger 10 is an exhaust heat exchanger cooled with a fluid, the heat exchanger 10 being is a component of an exhaust gas recirculation unit of a vehicle operating with an internal combustion engine.

In the exemplary heat exchanger 10 shown, plates 14, 16 are suitably shaped or profiled such as is known to those skilled in the art so that they may be secured to one another along their lateral edges to form flat tubes 18. The flat tubes 18 define a longitudinal channel for exhaust gas the direction of arrow 20. It should be understood that flow in either direction, as indicated by arrow 20, would be within the scope of the present invention.

Separate flow channels 24 for a coolant are defined between adjacent flat tubes 18, with the plates 14, 16 of the flat tubes 18 being suitably shaped or profiled such as is known to those skilled in the art so that the coolant flow channels 24 are enclosed about the perimeter so that coolant will flow generally in the direction of arrows 28 between aligned inlet openings 30 and aligned outlet openings 32. It should be understood that flow in either direction would be within the scope of the present invention. Coolant inlet connectors 36 and coolant outlet connectors 38 are suitably secured to the openings 30, 32, and are suitably connected to the system (not shown) with which the heat exchanger 10 is used and through which the coolant circulates.

A heat exchanger/plate arrangement such as illustrated in FIG. 1 is generally described in various detail in EP 992 756 A2, German Application DE 102 29 083.0, and EP Application EP 03 007 724.2, the disclosures of which are hereby fully incorporated by reference. It should be understood, however, that housingless heat exchangers of different configurations than the one shown in the Figures may be advantageously used in connection with the present invention.

One collecting tank 40 is illustrated in FIG. 1, and has an inlet or outlet opening 42 (depending on the direction of flow according to arrow 20) for the exhaust gas flowing through the flat tubes 18. As illustrated, however, the opening 42 may advantageously be an outlet for exhaust gas which has already passed through the flat tubes 18, and been cooled by the coolant in the flow channels 24.

It should be understood that a second collecting tank generally of the type illustrated could also be provided at the other end of the heat exchanger 10, though only the one tank 40 is illustrated. The second collecting tank may be generally identical to the illustrated tank 40 except that the openings for the valve (described below) may be omitted.

The collecting tanks 40 may advantageously have the shape of a diffuser, for which reason they exhibit significant tapering or conicity, which extends from the connection side on the plate stack to the connection side on the exhaust connection line (not shown) so that a relatively small cross-section of the inlet or outlet opening 42 is present.

As described in EP Application 03 007 724.2, the plates 14, 16 are assembled into a plate stack and collecting tanks 40 are pushed onto both ends of the plate stack (though only one such tank 40 is illustrated in FIG. 1), with the peripheral edge 46 of its wall 48 over the end of the plate stack. Where the plate stack includes protrusions 50 on the connected edges of the plates 14, 16, for example, the edge 46 of collecting tank 40 may be advantageously provided with folds 54 which are intended to accommodate one protrusion 50 each on the periphery of the plate stack, such as described in detail in EP Application 03 007 724.2, the full disclosure of which is hereby incorporated by reference.

The clamping effect of the collecting tank 40 on the plate stack is facilitated by this assembly manner. The individual plates 14, 16 and, if necessary, the collecting tank 40 may advantageously include an appropriate solder coating, so that the plate heat exchanger 10 prepared in this way can be joined into a compact plate heat exchanger 10 in a single soldering operation. Further, the connectors 36, 38 for the coolant (see FIG. 1) may also be introduced to the openings 30, 32 of the cover plate 60 and connected by soldered in the same manner. A second cover plate 62 is provided on the opposite side of the heat exchanger 10, whereby coolant flow channels 24 may be defined adjacent the outermost heat exchanging surface of the top and bottom flat tubes 18 carrying exhaust gas.

The collecting tank 40 in the illustrated example has two assembly openings 70, which are arranged in opposite walls 48 of the collecting tank 40. It should be understood, however, that a single assembly opening may also be advantageously used in accordance with the present invention, with the number of assembly openings 70 chosen based, for example, on the type of valve (described below) being incorporated, and/or the configuration of the collecting tank 40 itself.

A valve 80 may be advantageously provided in accordance with the present invention, with the valve 80 having a stem 84 consisting of two stem parts which are suitably fastened at opposite axial ends to a flap 88. The flap 88 may be suitably secured in the collecting tank 40 as described herein so that it may be selectively rotated to expose or block a larger or smaller cross-section of the collecting tank 40 based on rotation of the stem 84. The stem 84 is effectively connected to a control element 90 which may be suitably used to position the flap 88 as desired (e.g., according to the prevailing temperature).

In both assembly openings 70, a bearing bushing 94 may be advantageously inserted with the stem 84 rotatably supported in the bearing bushes 94. At the same time, the assembly openings 70 are sealed outward by the bearing bushes 94, with one stem part effectively connected to the control element 90 and passing through the corresponding bearing bushing 94 and expediently sealed therein. The other bearing bushing 94 may be advantageously designed to be cup-like. However, it should be recognized that it would be within the scope of the present invention to omit this second bearing bushing 94 and the corresponding second assembly opening 70. For example, an embossed or shaped recess of the wall 48 could instead be provided to rotatably mount the portion of the stem 84 at that end. Also, a one-sided support of stem 84 could also be provided for only the stem portion that is effectively connected to the control element 90.

If collecting tanks 40 which do not have a conical wall in the fashion of a diffuser are used, incorporation of the valve 7 can also be carried out through the inlet or outlet opening 42 in the collecting tank 40 facing the connection line, since this has a correspondingly larger cross-section without tapering or conicity.

A suitable retaining bracket 100 facilitates fastening of individual elements of valve 80 and the control element 90 to the heat exchanger 10 as a pre-assembled valve unit. The depicted retaining bracket 100, which may be produced by machining from sheet metal having several cut-outs, may be suitably adjusted to the height of the plate stack. Two angled legs 102 are provided on the retaining bracket 100, and have holes therein which cooperate with ears or protrusions 106 on the cover plates 60, 62 of the plate heat exchanger 10 for the purpose of fastening, as by screwing together (see screws 110).

In further accordance with the present invention, the housingless plate heat exchanger 10 may be advantageously assembled by stacking the plates 14, 16, 60, 62 into a plate stack, with the plate stack then held together and fixed by sliding a collecting tank 40 onto the two opposite ends. The plate heat exchanger 10 may then be completely soldered in a soldering furnace, after which the valve 80 (which may be advantageously used to enhance operation of the heat exchanger 10) is incorporated in one of the collecting tanks 40. Of course, additional parts (e.g., the connectors 36, 38) which can also be fastened by soldering may also be advantageously introduced to the plate stack and attached, either during an initial soldering step, or during the soldering step involving the stacked plates 14, 16, 60, 62 and collecting tanks 40.

It should therefore be appreciated that advantageous housingless plate heat exchangers 10 with a valve 80 integrated in the collecting tank 40 such as described may be advantageously manufactured in accordance with the above described process. That is, by assembling the plate stack and collecting tank 40 and then securing the assembly together by using a single initial soldering process with at least one assembly opening 70 in the wall 48 of the collecting tank 40 during assembly, the assembly opening 70 can be readily provided during manufacture of the collecting tank 40. Providing the assembly opening 70 at that stage of manufacturing eliminates undesirable residues which can remain in the plate heat exchanger 10 if the opening were created later in the process, and therefore the more or less demanding and therefore costly processes potentially required to remove such residues may be eliminated. (It should be understood, however, that it would be possible to use some aspects of the present invention by manufacturing the assembly openings 70 after the soldering step). Moreover, after soldering of the plate heat exchanger 10 with the collecting tank 40, the valve 80 can be incorporated by means of the assembly opening as a preinstalled valve unit. By providing the assembly opening, it is therefore possible to retain a very favorable manufacturing method of the plate heat exchanger.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A housingless plate heat exchanger, comprising:
    a plate stack defining fluid passages, including cover plates on said plate stack;
    protrusions on said cover plates;
    at least one collecting tank with a peripheral edge enclosing one end of the plate stack, said collecting tank and plate stack having
        a fluid opening, and
        at least one assembly opening;
    a valve receivable in said collecting tank through said assembly opening of the collecting tank and plate; and
    a valve retaining device secured to said protrusions.

2. The heat exchanger of claim 1, wherein the valve has a flap inside the collecting tank and a stem extending outside the collecting tank.

3. The device of claim 2, further comprising a bearing bushing in said at least one assembly opening supporting said valve stem.

4. The heat exchanger of claim 1, further comprising a second assembly opening in said one collecting tank.

5. The heat exchanger of claim 4, wherein said first and second assembly openings are in opposite walls of said one collecting tank.

\* \* \* \* \*

UNITED STATES PATENT AND TRADEMARK OFFICE
CERTIFICATE OF CORRECTION

PATENT NO. : 7,055,584 B2  Page 1 of 1
APPLICATION NO. : 10/847080
DATED : June 6, 2006
INVENTOR(S) : Viktor Brost It is certified that error appears in the above-identified patent and that said Letters Patent is hereby corrected as shown below:

Column 6, line 18, after "plate" insert --stack--.

Signed and Sealed this

Tenth Day of April, 2007

JON W. DUDAS
*Director of the United States Patent and Trademark Office*